July 27, 1937.   F. PREINERSTORFER   2,088,339
OPTICAL ARRANGEMENT FOR USE IN COLOR PHOTOGRAPHY
Filed Nov. 17, 1934
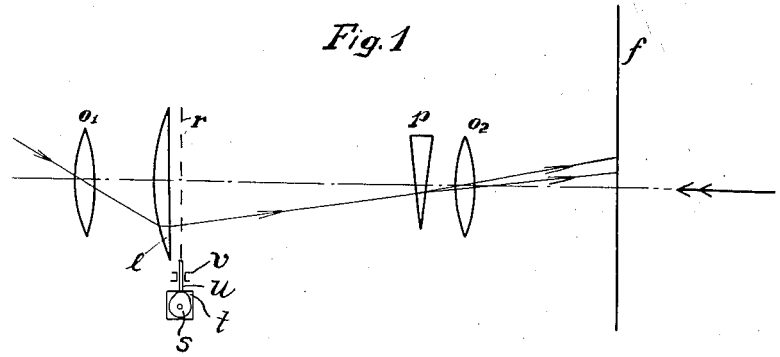
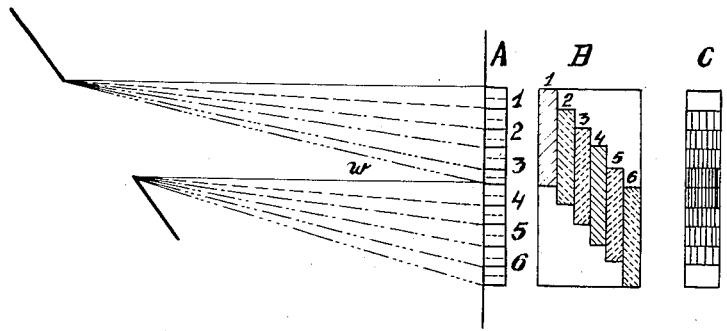
Inventor
Franz Preinerstorfer
By Knight Bros
His Attorneys Patented July 27, 1937

2,088,339

UNITED STATES PATENT OFFICE 2,088,339

OPTICAL ARRANGEMENT FOR USE IN COLOR PHOTOGRAPHY

Franz Preinerstorfer, Gmunden, Austria

Application November 17, 1934, Serial No. 753,520
In Austria December 30, 1933

3 Claims. (Cl. 88—16.4)

This invention relates to optical systems for use in the production and reproduction of colored photographs, more particularly in moving picture photography.

It is an object of the invention to provide simple and reliable means for breaking up the light from the light portions of an image into the constituent colors of the spectrum. A further object is to enable the available light to be utilized to the fullest possible extent, by dispensing with the use of color filters. Another object is to provide for controlled variation of the color tone and distribution during reproduction, in a simple and effective manner. Further objects of the invention will become apparent in the course of the ensuing description.

The invention is based upon the fact of optics that the line of demarcation between two surfaces of different degrees of luminosity, when observed through a prism with its refracting edge set parallel to the said line, exhibits colored borders the color intensity of which depends on the difference in luminosity between the two contiguous surfaces in question. In other words, the invention is based on the fact that a black streak of a certain breadth on a white ground, when looked at through a prism with its refracting surface set parallel to the plane of the said streak, appears to have colored borders which at a certain distance, according to the refracting power of the prism, completely cover up the black streak and are then precisely twice the breadth of the streak. Substituting the photographic camera for the human eye, and arranging for a screen of parallel black streaks of the same breadth as the intervening gaps to be superimposed upon the image of the object to be photographed gives, in rough outline, the manner in which this phenomenon is made use of for the present purpose. Without a prism a sharp image of the streak screen would be thrown upon the sensitive surface.

In accordance with the invention, the prism used must be so selected that it spreads the individual spectral images of the gaps apart to just such an extent that they overlap without allowing any white to appear. In other words the projected mixed color spectra must be precisely twice as wide as the gaps.

If now an object be placed in the plane of the streak screen, or rather if an image of a colored object be produced by an optical system in the plane of the streak screen, the individual spectral color components of this image, according to their actinic value, while being partly merged into each other, will nevertheless leave definite reproductions of the color values of the object upon the photographic film. It goes without saying that for this purpose there must be used an orthochromatic film with as far as possible equal values for the different colors.

The reversal of the described procedure gives the arrangement for reproduction by projection, a suitable source of light being placed behind the developed film.

An arrangement embodying the principle of the invention is shown diagrammatically, and by way of example, in the accompanying drawing which forms a part of this specification, and to which reference is had in the following detailed description of the respective elements used and of the mode of operation of the arrangement as a whole.

In the drawing—

Fig. 1 shows diagrammatically the arrangement of lenses, prism, and streak screen according to the invention.

Fig. 2A shows diagrammatically the spectrum of one of the transparent streaks of the streak screen.

Fig. 2B shows diagrammatically the overlapping of the colors of the spectrum shown in Fig. 2A, and Fig. 2C shows diagrammatically the values of the individual parts of the spectrum.

Referring to Fig. 1 of the drawing, there is mounted in front of the sensitive layer $f$ of a panchromatic photographic film a normal optical system or unit $o_2$ adapted to produce a sharp image of the gaps in the screen $r$ upon the surface $f$. The screen $r$ is provided with alternating transparent and non-transparent streaks of equal breadth which are indicated by a broken line in the drawing. In practice this screen is provided with a very large number of closely spaced streaks, as is well known. The drawing is therefore not to be understood as indicating the actual number of streaks. In front of the optical system or unit $o_2$ there is mounted the prism $p$ of such an angle of refraction and such dispersing power that the images of the gaps or transparent streaks of the screen in their spectral colors are spread apart to such an extent that, while being partly overlapped, they allow no white to appear. Fig. 2 of the drawing indicates how the individual spectral colors are produced, the main colors of the spectrum, red, orange, yellow, green, blue, and violet being denoted by the numbers 1, 2, 3, 4, 5, and 6, respectively, at B. The resulting images of the gaps or transparent streaks in the screen are precisely twice as wide as the images would be without the use of the prism, and thus lie contiguously without overlapping, and without any gaps therebetween. Adjoining the red of one gap image there is therefore the violet of the next gap image, and so forth throughout the series. Assuming the photographic layer to be equally sensitive for all the colors of the spectrum, on exposure to white there results a darkening of the negative in such a manner that the middle portion of the spectral streaks becomes darkest in consequence of the addition of the individual primary colors, while the edges, where only one color is effective, remain lightest. At C the value of the individual parts of the spectrum is indicated by graduated shading. As will be seen, white, indicated by $w$, does not appear at all in the image.

In front of the screen $r$ there is mounted the objective $o_1$ which produces an image of the focussed object in the plane of the screen $r$. With the aid of a collecting or collimation lens $l$ this image is projected with a minimum loss of light through the optical system or unit $o_2$ on to the surface of the sensitive layer $f$.

For the purposes of reproduction the same arrangement of parts is used, only with the rays passing in the reverse direction, as indicated by the double arrow in Fig. 1 of the drawing. The translumination of the film is effected with a suitable source of light which should give as white a light as possible.

In the diagrammatic representation given in Fig. 1 a simple prism is shown. Under practical conditions, however, a rectilinear prism is employed, in order to obtain a straight line path of the rays. The prism, instead of being isolated, can also be combined with one of the lenses of the optical system or unit, with a view to avoiding losses by reflection.

As compared with arrangements of a somewhat similar nature based on the principle of dispersion, the arrangement according to the present invention has the particular advantage that only half of the incident light becomes lost on account of the screen streaks, leaving an effective percentage light intensity far higher than that obtainable with any other known arrangement for the same purpose. The appearance of the screen image on the projection surface, which is unavoidable for the subdivision of the picture and for the precise reproduction of the color values, can be rendered invisible to the eye, more particularly in the case of cinematographic projection, by mechanically changing about the positions of the transparent and non-transparent streaks on the screen, in a corresponding sense both during production and during reproduction, for example by reciprocating the screen through a distance equal to the breadth of a streak. The screen can be reciprocated, for example, by means of an eccentric $s$ acting upon a guide $t$ fixed to a rod $u$ guided in a bearing $v$ and fastened to the streak screen $r$. This possibility results from the fact that the transparent and opaque streaks on the screen are of equal breadth, and constitutes a further advantage of the arrangement according to the invention.

What I claim as my invention is:

1. An optical arrangement for the production and reproduction of colored photographic pictures comprising in combination an objective, a streak screen disposed in the focal plane of the said objective and having alternating transparent and opaque streaks all of equal breadth, a prism having its refracting edge set parallel to the lines of the said screen, an optical system, and a picture surface in the focal plane of the said system, the angle of refraction and the refractive power of the material of the said prism being such that the image of the said screen on the said surface consists of contiguous spectral bands each of which is twice as wide as each of the said streaks.

2. An optical arrangement as claimed in claim 1, further comprising a collecting lens interposed between the said objective and the said screen, for the purpose of directing the rays from said objective to said optical system with a minimum loss of light.

3. In an optical arrangement as claimed in claim 1, mechanical means for reciprocating the said screen in a direction transversely of the streaks thereon through a distance equal to the breadth of one of the said streaks.

FRANZ PREINERSTORFER.